United States Patent [19]

Ito

[11] Patent Number: 4,940,689
[45] Date of Patent: Jul. 10, 1990

[54] DISPLAY MATERIAL

[75] Inventor: Kengo Ito, Kanagawa, Japan

[73] Assignee: Sony Corporation, Tokyo, Japan

[21] Appl. No.: 201,918

[22] Filed: Jun. 3, 1988

[30] Foreign Application Priority Data

Jun. 6, 1987 [JP] Japan .................. 62-141714

[51] Int. Cl.⁵ ............................. B41M 5/20
[52] U.S. Cl. ................... 503/202; 428/913; 503/204; 503/226
[58] Field of Search ............... 427/150–152; 428/913, 914; 503/202, 204, 220, 226

[56] References Cited

FOREIGN PATENT DOCUMENTS

| 50-156942 | 12/1975 | Japan | 503/204 |
| 0074351 | 6/1977 | Japan | 503/204 |
| 0017115 | 2/1980 | Japan | 428/913 |
| 1073785 | 4/1986 | Japan | 503/202 |

Primary Examiner—Bruce H. Hess
Attorney, Agent, or Firm—Hill, Van Santen, Steadman & Simpson

[57] ABSTRACT

A novel display material is disclosed, which comprises a material layer containing a dye and a supporting electrolyte.

The material layer is capable of solid-liquid transformation. The coloration and discoloration of the layer are effected by oxidation reduction reaction of the dye by applying current to the material layer in liquefied state.

The display material may be used as electrochromic display and thermosensitive recording paper.

8 Claims, 4 Drawing Sheets

DISPLAY MATERIAL

BACKGROUND OF THE INVENTION

This invention relates to a display material which is capable of reversibly changing its coloring condition by application of heat and an electric field, and more particularly to a novel display material which is useful as electrochromic display element material and thermosensitive recording material.

For example, in the field of thermosensitive recording paper, there has been used a display material which has a leuco-dye dispersed in the form of crystallite in a binder together with a developer or activator so that, when thermally fused, the pigment and the developer are contacted with each other on a molecular level to develop a color. More specifically, the conventional thermosensitive recording paper which is in wide use has crystallites of a leuco dye and phenolic compound as the developer dispersedly coated together with a hydrophilic binder on substrate paper (a support body) such as synthetic paper or the like.

However, in consideration of the manufacturing process, the conventional thermosensitive recording paper of such a construction unavoidably suffers from the problem of fogging (a slight degree of coloration before printing). Namely, it is difficult to avoid a certain degree of reaction between the crystallites of the leuco dye and phenolic compound as the developer during the manufacturing process in the stages of kneading them into a hydrophylic binder, coating and drying, as a result coloring the heat sensitive paper as a whole in grey to a certain degree before serving for printing. Thus, at the present moment it is difficult to obtain thermosensitive recording paper which is satisfactory in whiteness. In addition, the above-mentioned conventional thermosensitive recording paper is susceptible to colorations by inadvertent heating, for example, colorations by application of heat during storage or after printing, making the printed information illegible or inviting considerable degradations in the quality of picture images.

Nevertheless, due to the steady increase in the amount of documents which are handled in the office work, there have been strong demands for thermosensitive recording paper which can be used repeatedly, from a viewpoint of saving space and resources. Besides, polychromic coloration of thermosensitive paper is considered for improving visibility of documents or the like.

However, the demands cannot be fulfilled by the conventional thermosensitive recording paper, including the sublimation transfer type and the thermal fusion type which are also unsatisfactory in case of high-speed full-color image production by a thermal head and are almost impossible to use repeatedly for reproduction.

On the other hand, in the field of the display, researches have been made for development of a display material which is suitable for the so-called flat display of a flat plate-like shape, including development of electrochromic display elements.

In this connection, the conventional electrochromic display elements are mostly designed for monochromic coloration and decoloration, and scarcely capable of coloration and decoloration in three primary colors such as RGB (the three primary colors in the additive color method) and YMC (the three primary colors in the subtractive color method) suitable for the full-color display.

Since, as mentioned hereinbefore, the conventional display materials used in the fields of the thermosensitive recording paper and display invariably lack stability and are difficult to apply to repeated use and polychromic coloration and insufficient in color vividness, the development of a novel display material which can eliminate these problems is greatly expected.

OBJECT AND SUMMARY OF THE INVENTION

It is an object of the present invention to provide a novel recording material which overcomes the above noted drawbacks.

It is another object of the present invention to provide a recording material which is free of inadvertent coloration.

It is further object of the present invention to provide a recording material which can effect reversible coloration and discoloration.

It is still further object of the present invention to provide a novel thermosensitive recording paper.

It is yet further object of the present invention to provide a thermosensitive recording material which can effect multi or full coloration.

According to one aspect of the present invention, there is provided a display material which comprises a material layer containing a dye and a supporting electrolyte. The material layer is capable of solid-liquid transformation upon heating and cooling the layer. The coloration and discoloration can be effected by inducing oxidation, reduction reaction of the dye by applying current to the material layer in liquefied state.

DESCRIPTION OF THE PREFERRED EMBODIMENTS

Figure 1:
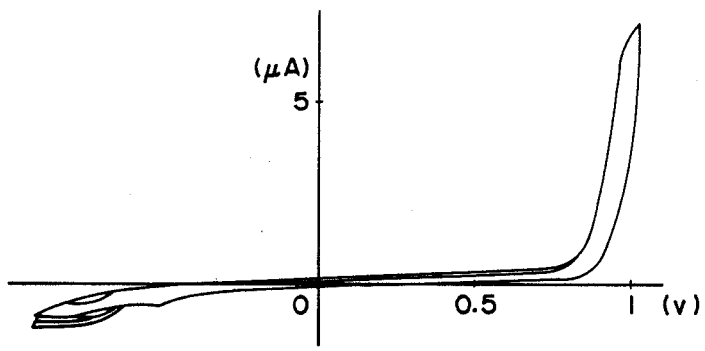
FIG. 1 is a diagram showing the cyclic voltamogram of a fluoran type leuco dye which produces a black color.

The inventor has conducted an intensive study over a long period of time in an attempt to develop a novel display material which can electrically control the colored or decolored condition, and as a result has found that the electrode reaction which induces the oxidation-reduction of a dye can be effected in a solid-liquid transformable material layer by thermally fusing the layer.

The display material of the invention has been achieved on the basis of this finding, and consists of a material layer which contains a dye and a supporting electrolyte and which is capable of solid-liquid transformation by heating and cooling same, characterized in that an oxidation and/or a reducing reaction of the pigment is induced for coloration and decoloration by applying current to the material layer when in a liquefied state.

The dye to be used may be of any kind as long as it can be colored, decolored or discolored by electric oxidation/reducing reactions no matter whether its coloration, decoloration or discoloration is reversible or irreversible. The display material can serve for repeated use if the coloration and decoloration are reversible, and can be used as a write-once type if irreversible.

Examples of the dyes of that nature include leuco dyes having a lactone ring, such as triphenylmethanephthalides, thiofluorans, indolylphthalides, azaphthalides and the like, and rhodamine lactams, including the following compounds.

Examples of triphenylmethanphthalides include Crystal Violet lactone, Malachite Green and the like; and examples of fluorans include 3-ethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethylfluoran-phenylhydrazide-$\gamma$-lactam, 3-amino-5-methylfluoran, 2-methyl-3-amino-6-methyl-7-methylfluoran, 2,3-butylene-6-di-n-butylaminofluoran, 3-diethylamino-7-anilinofluoran, 3-diethylamino-7-(paratoluidino)-fluoran, 7-acetoamino-3-diethylaminofluoran, 2-brom-6-cyclohexylaminofluoran, 2,7-dichloro-3-methyl-6-n-butylaminofluoran and the like.

Examples of thiofluorans include 3-diethylamino-6-methyl-7-dimethylamino-thiofluoran, 3-diethylamino-7-dibenzylamino-thiofluoran and the like; examples of indolyl-phthalides include 8-(4-diethylaminophenyl)-8-(1-ethyl-2-methylindole-8-yl) phthalide, 3,3-bis (1-ethyl-2-methyl-8-yl) phthalide, 3,3-bis (2-phenylindole-3-yl) phthalide, 3-(4-di-n-butylaminophenyl)-3-(2-phenylindole-3-yl) phthalide, 8-[4-(dimethylamino) phenyl]-3-[N,N-bis-(4-octylphenyl) amino] phthalide and the like.

Further, examples of rhodamine lactams include rhodamin lactone and the like; examples of azaphthalides include 3,3-bis (1-ethyl-2-methylindole-3-yl)-7-azaphthalide and the like.

In addition to the above-mentioned dyes, it is possible to use: leuco basic cyanine, leuco-malachite green, leuco crystal violet, p,p'-tetradimethyldiaminobenzophenone (Michler's ketone), an oxazine-base leuco thermosensitive dye (e.g. "CSB-12" a product of Hodogaya Chemicals Co.), spiropyran-base leuco thermosensitive dye (e.g. "CSR-13" a product of Hodogaya Chemicals Co.), a quinoline-base thermosensitive dye (e.g. "CSY-13" a product of Hodogaya Chemicals Co.) and the like.

Among these dyes, it is preferred to be a leuco dye having a lactone ring like the fluoran-base compound and the phthalide-base compound. In a case where a leuco dye with a lactone ring is used, reversible oxidation and reducing reactions can be induced adequately to repeat the coloration and decoloration reversibly.

The above-mentioned dyes may be used singly or two or more dyes of different kinds may be mixed for the purpose of controlling the color tone or for other purposes.

The concentration of the dye to be added to the material layer is determined suitably depending upon the desired color density. The solubility of the dye in the insulating medium and the supporting electrolyte, which will be described hereinlater, imposes an upper limit on the concentration since the dye has to be completely dissolved in the material layer. Although there is no particular restriction to the lower limit of the concentration, it is preferred to be contained in the material layer in a concentration greater than $1/10^7$ by weight ratio in consideration of the contrast of coloration and decoloration.

On the other hand, the supporting electrolyte is added in order to secure the conductivity of the material layer in fused state and to accelerate the oxidation and reducing reactions of the dye. Examples of useful electrolytes include aliphatic quaternary ammonium salts such as tetra-n-butylammonium tetrafluoroborate, tetra-n-butylammonium perchlorate, cetyltrimethylammonium bromide, dioctadecyldimethylammonium chloride and the like, benzalkonium salts such as myristyldimethylbenzylammonium chloride and the like, benzethonium chlorides such as benzyldimethyl (2-[2-(p-1,1,3,3-tetramethylbutylphenoxy) ethoxy] ethyl) ammonium chloride and the like, alkylpyridinium salt, imidazolinium salt and the like.

In addition to the foregoing compounds, ionic surfactants such as anionic surfactants are useful as the aforementioned supporting electrolyte. Examples of the anionic surfactants include: carboxylic acid salts as represent by fatty acid soap, sodium palmitate, potassium stearate, alkylether carboxylate, and the like; sulfonic acid salts as represented by alkylbenzinesulfonate such as sodium laurylbenzinesulfonate or the like, alkylnaphthalenesulfonate such as sodium naphthalenesulfonate and the like, sodium naphthalenesulfonate-formalin condensate, esterified salt of dialkoxysulfosuccinic acid and the like; esterified salts of sulfuric acid as represented by alkylsulfate, alkylethersulfate, polyoxyethylenealkylethersulfate, alkylphenylethersulfate and the like; and esterified salts of phosphoric acid such as alkylphosphoric acid, alkyletherphosphoric acid and the like.

These ionic surfactants, however, have possibilities of thermal coloration due to an acidic substance when used as the supporting electrolyte, so that it is preferred to employ the above-mentioned ammonium salts as the electrolyte.

The concentration of the supporting electrolyte to be dissolved in the solid-liquid transformable insulating medium as will be described hereinlater is naturally limited by its own solubility since it has to be completely dissolved in the insulating medium. The electrolyte should have at least a concentration which is sufficient for effecting the oxidation and reduction of the dye through electrodes. Accordingly, although it depends on the nature of the insulating medium, the concentration of the supporting electrolyte in the material layer is preferred to be in the range between $10^{-10}$ mol/l and the limit of solubility, more preferably, between $10^{-3}$ mol/l and $10^{-1}$ mol/l. This preferred range of concentration is not applicable to a case where the supporting electrolyte itself is solid-liquid transformable and the insulating medium is not needed. In such a case, the concentration of the dye which is soluble in the supporting electrolyte is set in a suitable range.

The above-mentioned dye and supporting electrolyte are dissolved in the insulating medium to form the material layer. Therefore, the insulating medium to be used is required to dissolve the dye and support electrolyte and to be solid-liquid transformable on heating and cooling.

The insulating medium may be of any material as long as it can meet these requirements, for example, may be polyethylene, polyacrylate, polymethacrylate or polyacrylamide, or a homopolymer or copolymer thereof. Above all, polymers which have long alkyl chains in their side chains are preferred. These polymers can be synthesized, for example, by polymerizing a higher fatty acid ester of acrylic acid or methacrylic acid in straight chains in the absence or presence of other monomer by the radical polymerization process or the radical copolymerization process. Otherwise, there may be employed a liquid crystal polymer such as cyanobiphenyl-base polymer, a copolymer of chanophenylbenzoate and methoxybiphenylbenzoate, a phenylbenzoate·azomethine-base polymer, an azomethine-base polymer or the like.

Further, in order to make the display material of the invention rewritable, it is preferred to use a polymer which has in its molecular structure at least one carbonyl group (C=O) as represented by ester or ketone to provide, so to say, a thermal reaction mechanism which assists the reversible reducing reaction of the leuco dye.

Moreover, taking the relative dielectric constant as a measure of solubility of the insulating medium, the aforementioned supporting electrolyte has to be soluble when in solid state or at least when in liquefied state to produce the electrochromic property, so that it is preferred to use a material which has relative dielectric constant greater than 10 in consideration of, for example, the solubility of quaternary ammonium salt (the support electrolyte).

In a case where the support electrolyte itself is solid-liquid transformable, the insulating medium is not necessarily required, and the material layer may be formed by dissolving the dye in the support electrolyte.

In the display material according to the invention, with the material layer composed of the aforementioned dye, support electrolyte and insulating medium, coloration and decoloration take place by oxidation and reduction reactions of the dye when current is applied to the material layer in liquefied state. Consequently, it becomes possible to form picture images or to print characters in the material layer by using same in combination with a heating means and a current applying means.

The heating and current applying means can be employed in various combinations.

Firstly, current may be applied to the entire area of the material layer while heating its entire area. In such a case, the material layer as a whole is colored and decolored in a manner suitable for application to large-size displays.

It is also possible to apply current selectively to the material layer while heating the entire area of the layer. For the selective current application to the material layer, there is a method of forming a transparent electrode X-Y matrix on each side of the material layer. In this instance, while heating the material layer by a total area heating means, predetermined electric signals are supplied through a selective current applying means to write in a picture image or a character according to the electric signals. The heating by the total area heating means is stopped upon completion of the write-in operation, and the material layer is cooled to fix the picture image or character.

Conversely to the above-described method, a picture image or character may be formed by a selective heating means while applying current to the entire area of the material layer. In this case, the oxidation and reduction reactions of the dye take place only in the material layer portions which have been fused by the selective heating means, producing a picture image or character by coloration or decoloration of those portions. Examples of the selective heating means include the thermal head, laser light or means utilizing Joule heat. Especially in a case where the selective heating is effected by the photothermal converting action of laser light, however, it is preferred to enhance the photothermal conversion efficiency by mixing into the material layer a sensitized pigment which effectively absorbs the laser light, for example, an infrared-sensitized pigment in case of a semiconductor laser.

It is also possible to use a selective heating means in combination with a selective current application means. For the selective heating and current application, any of the above-described methods can be used in a similar manner.

The display material according to the present invention can be used as an electrochromic element, for example, by filling same in a glass cell which is formed with electrodes, or alternatively can be applied as a thermo-sensitive recording paper by coating same on paper or a plastic film to form a solid coating film thereon. Further, it can be utilized in various fields as a rewritable or fixable display material. In any case, it is possible to control the coloring condition by selecting a number of dyes, or to coat the material in multiple layers which contains dyes of different colors for multichromic or full-color display.

It is considered that an ordinary organic substance has insulating property in solid state, and therefore no drastic increase in conductivity is expected even if it is used as a medium for co-dissolving the electrolyte. This is because in solid state the molecules are freezed with a low diffusion constant and the electrolyte (carrier) is barely movable.

However, if the organic medium is liquefied, the aforementioned diffusion constant is increased by $10^3$ to $10^5$ to bring about ion conduction by the diffusion and thermal mobility of the electrolyte. As a result, the conductivity of the consolute system (i.e., the material layer) is enhanced to a marked degree, permitting to control the reversible coloration and decoloration (or oxidation-reduction reactions) of the dye by external current application.

Namely, in the display material of the invention, the colored or decolored condition is fixed when the material layer is in solid state irrespective of the current application. On the contrary, if the material layer is fused into liquid state by a heating means, current flows through the system upon application of a voltage, depriving electrons on the side of the positive electrode to induce a reducing reaction of the dye, coloring (decoloring or discoloring in some case) the dye in the vicinity of the positive electrode. In this liquefied state, if a voltage of the opposite polarity is applied to the material layer, electrons are supplied to the reduced dye, inducing its oxidation reaction to decolor (or color or discolor in some case) the pigment.

The following formula summarizes the above-described coloration-decoloration mechanism of the material layer.

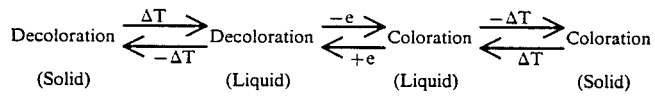

(Examples)

The invention is illustrated more particularly by way of results of experiments in the following Examples.

Experimental Example 1

Firstly it was confirmed that the coloration and decoloration was repeated through oxidation and reduction reactions of the leuco dye by application of current.

Namely, a display material solution of the following composition was prepared, and the oxidation potential of the used leuco dye was measured by cyclic voltamography. The measurement used a platinum wire for the acting electrode and Pt for the opposite electrode.

| Composition (part by weight) | |
|---|---|
| 2-(2'-chlorophenylamino)-6-di-n-butylaminofluoran (a leuco dye "TH107" produced by Hodogaya Chemicals Co.) | 0.54 parts |
| tetra-n-butylammonium perchlorate (support electrolyte) | 3.4 parts |
| acetonitrile (solvent) | 100 parts |

The used leuco dye had the structure as expressed by the following formula (I).

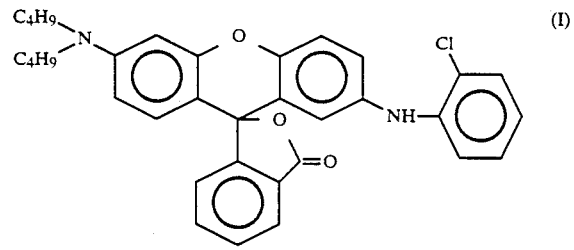

Shown in FIG. 1 is a voltagram using as a reference Ag/AgCl electrodes in acetonitrile. As seen in FIG. 1, it was confirmed that the oxidation potential of the leuco dye was approximately 0.85 V.

In the above-mentioned cyclic voltamography, patterns similar to FIG. 1 were obtained in a plural number of repeated scans, and the oxidation-reduction reactions of the leuco dye were found to be reversible.

Nextly, a plate electrode coated with ITO (indium tin oxide) deposited by the vacuum evaporation process was immersed in the solution as an acting electrode instead of the platinum wire, and a voltage of 1.0 V was applied to this plate electrode by way of a reference electrode (i.e., to apply current), measuring variations in the absorption spectrum on the surface of the plate electrode. The results are shown in FIG. 2, in which the solid line indicates the absorption spectrum at the time of voltage application (oxidation) while the broken line indicates the absorption spectrum at the time of no-voltage application (reduction).

Figure 2:
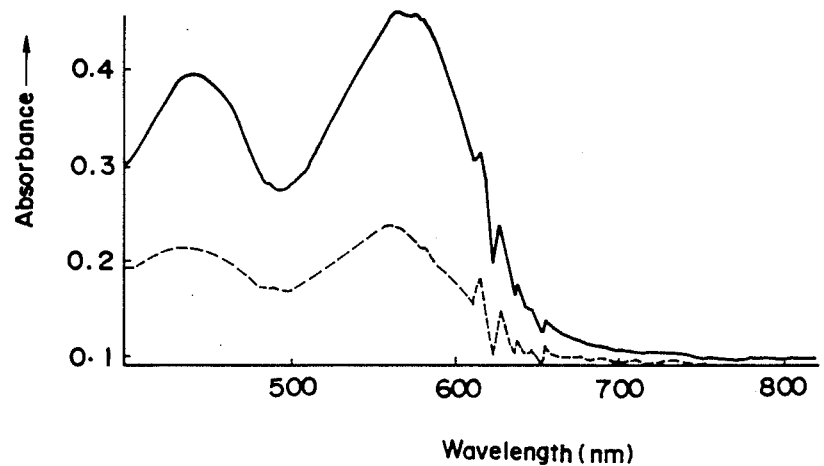
FIG. 2 is a diagram of absorption spectrum of the same dye.

It is clear from FIG. 2 that the density of coloration is increased by the voltage (current) application, implying applicableness as an electrochromic display element.

The produced color was reddish violet - reddish black, which was faded out of view upon application of a voltage of the opposite polarity, exhibiting the reversibility.

Experimental Example 2

Nextly, the following experiment was conducted to probe into possibilities of multichromic coloration of the display material.

Using the three kinds of leuco dyes indicated below, display material solutions were prepared in the same manner as in Experimental Example 1.

Leuco dye A: A phthalide compound which produces the cyan color by introducing a substituent group to the phthalide skeleton. ("HC-1" a product of Hodogaya Chemicals Co.)

Leuco dye B: A fluoran compound which produces the magenta color by changing the substituent group of the fluoran skeleton. ("HM-1" a product of Hodogaya Chemicals Co.)

Leuco dye C: A fluoran compound which produces yellow color by changing the substituent group of the fluoran skeleton. ("HY-1" a product of Hodogaya Chemicals Co.)

The oxidation potential of each one of these display material solutions was measured by the cyclic voltamography in the same manner as in Experimental Example 1. As a result, each leuco dye was found to have the following oxidation potential.

| Leuco dye A | 0.8 V |
|---|---|
| Leuco dye B | 0.9 V |
| Leuco dye C | 1.7 V |

Figure 3:
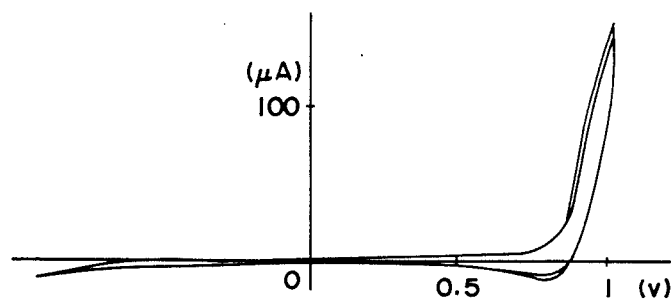
FIG. 3 is a diagram showing the cyclic voltamogram of a phthalide type leuco dye which produces a cyan color.
Figure 4:
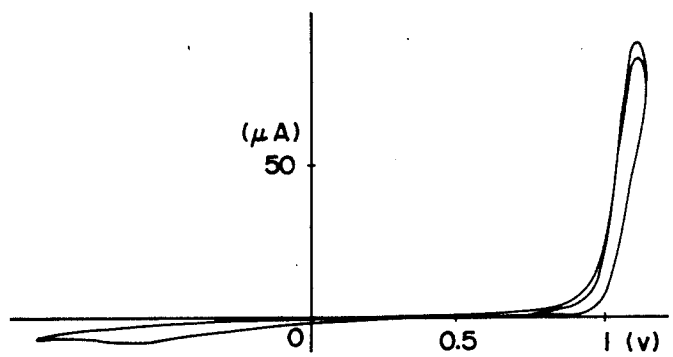
FIG. 4 is a diagram showing the cyclic voltamogram of a fluoran type leuco dye which produces a magenta color.
Figure 5:
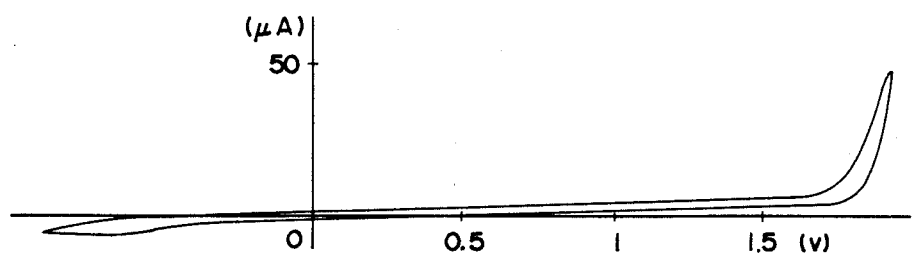
FIG. 5 is a diagram showing the cyclic voltamogram of a fluoran type leuco dye which produces a yellow color.

The cyclic voltamograms of the respective display material solutions are shown in FIGS. 3 to 5. More particularly, FIG. 3 shows the cyclic voltamogram of the display solution using the leuco dye A; FIG. 4 the cyclic voltamogram of the display solution using the leuco dye B; and FIG. 5 the cyclic voltamogram of the display solution using the leuco dye C. The reaction of each leuco-dye was reversible in the same manner as in Experimental Example 1.

Further, with respect to each display material solution, the absorption spectrum on the plate electrode was measured in the same manner as in Experimental Example 1. The results are shown in FIGS. 6 to 8, in which the solid line indicates the absorption spectrum at the time of voltage application (oxidation) while the broken line indicates the absorption spectrum at the time of no-voltage application (reduction).

Each display material solution exhibited the same spectral characteristics as when colored by a phenolic color developer in a acrylic acid-base polymer, producing a cyan, magenta or yellow color upon application of voltage depending upon the kind of the containing leuco dye, decoloring by a reverse reaction upon application of a voltage of the opposite polarity.

Figure 6:
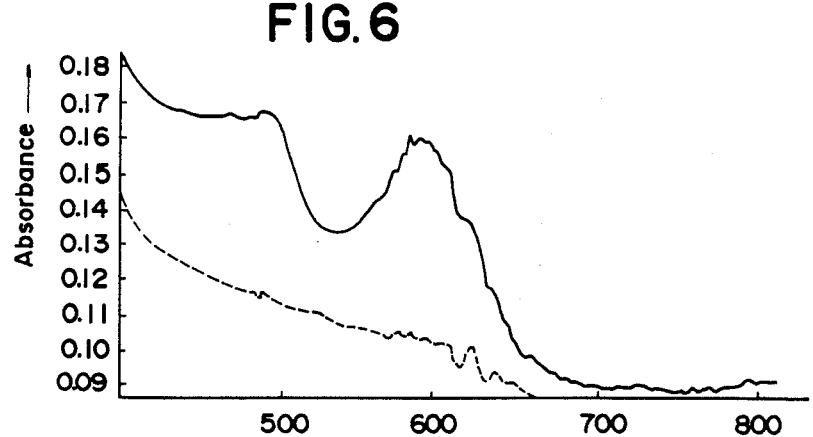
FIG. 6 is a diagram of absorption spectrum of the cyan color phthalide type leuco dye.
Figure 7:
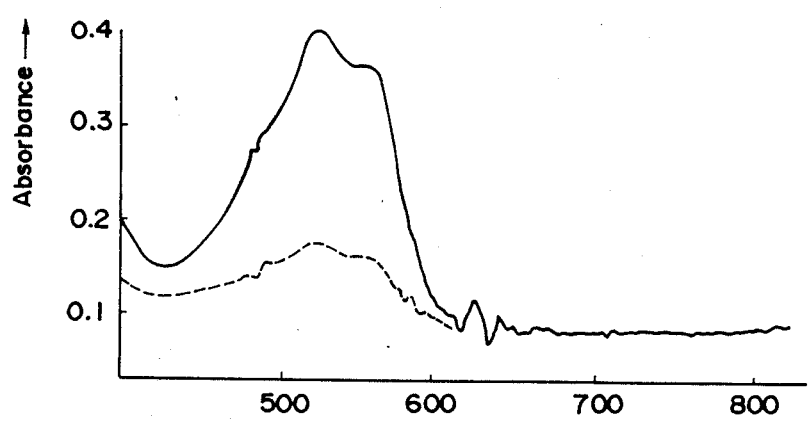
FIG. 7 is a diagram of absorption spectrum of the magenta color fluoran type leuco dye.
Figure 8:
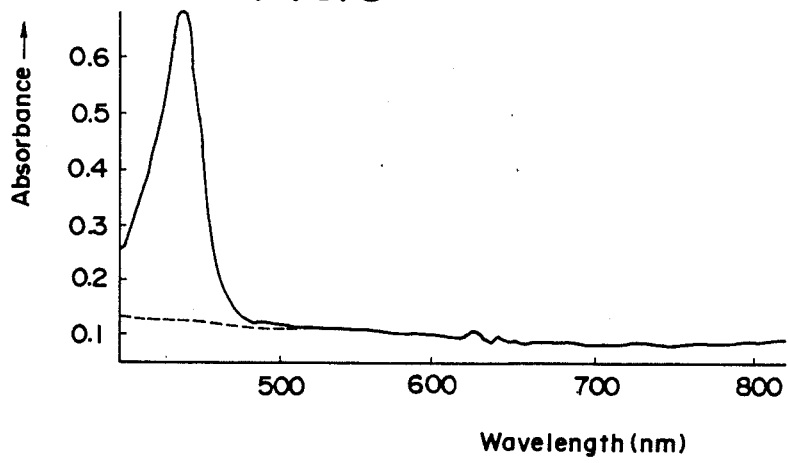
FIG. 8 is a diagram of absorption spectrum of the yellow color fluoran type leuco dye.

Consequently, as seen from FIGS. 6 to 8 and also from FIGS. 3 to 5, it has been revealed that the coloration and decoloration of yellow, magenta and cyan are electrically controllable.

Experimental Example 3

The foregoing Experimental Examples revealed the feasibility of the electric control of coloration, decoloration or discoloration of leuco dyes. However, in the foregoing Experimental Examples, the display material is in the form of a solution at room temperature, which gives rise to problems such as volatilization of the solvent, difficulty of handling and dispersion of the colored pigment when actually applied as a display element.

In view of these problems, this Experimental Example was directed to the solid-liquid transformable display material which could be handled as a solid when in unused state.

Firstly, a composition of the under-mentioned composition was stirred for 1 hour at 100° C. to obtain a consolute system dissolving the respective components. While maintaining at 100° C., the consolute system was sandwiched between glass sheets each with a vacuum evaporation coating film of ITO, and then cooled and maintained at room temperature. A spacer of polyethylene film was interposed between the glass sheets to adjust the thickness of the consolute system approximately to 50 μm.

| Composition (part by weight) | |
| --- | --- |
| p-dodecyloxycyanobiphenyl (solid-liquid transformable insulating medium) | 50 parts |
| dioctadecyldimethylammonium chloride (support electrolyte) | 50 parts |
| 2-(2'-chlorophenylamino)-6-di-n-butyl-aminofluoran (a leuco dye "TH107" a product of Hodogaya Chemicals Co.) | 15 parts |

The consolute system of the above composition was in solid state at room temperature, and liquefied at about 50° C., reversibly repeating solid-liquid transformation.

Nextly, at room temperature (with the composition in solid state), direct current of 9 V was applied across the electrodes (vacuum evaporation films of ITO) formed on the glass sheets, but no change in color was observed. At this time, the resistance between the electrodes was approximately 400 KΩ.

Then the whole glass cell formed by the glass sheets was heated to 60° C., and under this heated condition (with the solution in liquefied state) direct current of 9 V was applied in the same manner, whereupon coloration in dark green instantly took place (coloration of the interface on the positive side). The color disappeared upon reversing the direction of the voltage (current) application. Continued voltage application in this state (with the polarity of the applying voltate in the reversed state) resulted in coloration of the interface on the opposite side. This electric coloration and decoloration could be repeated at least ten times.

A measurement revealed that the electric resistance between the electrodes dropped to about 10 KΩ in the thermally fused state.

Experimental Example 4

Though the foregoing Experimental Example 3 employed a liquid-crystalline substance (p-dodecyloxycyanobiphenyl) as the medium which is solid-liquid transformable and which has good solubility with the support electrolyte, this Experimental Example employed a support electrolyte which itself was solid-liquid transformable, dispensing with the insulating medium.

An experiment was conducted by the use of the following composition.

| Composition (part by weight) | |
| --- | --- |
| 2-(2'-chlorophenylamino)-6-di-n-butylamino-fluoran (a leuco dye "TH107" a product of Hodogaya Chemicals Co.) | 1 part |
| myriystylbenzyldimethylammonium bromide (support electrolyte) | 50 parts |

The mixture of the above composition was stirred for 1 hour at 100° C. to obtain a uniform, pale yellow solution.

The total amount of the solution was put in a beaker, in which a couple of electrodes consisting of a glass sheet deposited with an ITO transparent electrode and a Pt plate were inserted (with an inter-electrode distance of 10 mm). While maintaining the temperature at 100° C., direct current of 12 V was applied for 5 seconds in such a manner as to apply the positive potential to the ITO transparent electrode, whereupon the surface of the ITO electrode was colored in dark green. Reversal of the polarity of the applying voltage promptly decolored the surface of the ITO transparent electrode.

This composition did not show any coloring reaction at room temperature (in solid state) similarly to the composition of Experimental Example 3.

Experimental Example 5

It was known from the foregoing Experimental Examples that the coloration and decoloration of the solid-liquid transformable display material could be controlled only in liquid state. Therefore, this Experimental Example studied the preservability of the colored and decolored conditions.

| Composition (part by weight) | |
| --- | --- |
| ethylene carbonate (solid-liquid transformable insulating medium) | 100 parts |
| tetra-n-butylammonium tetrafluoroborate (support electrolyte) | 5 parts |
| 2-(2'-chlorophenylamino)-6-di-n-butylamino-fluoran (a leuco dye "TH107" a product of Hodogaya Chemicals Co.) | 0.7 parts |

A mixture of the above composition was stirred for 1 hour at 100° C. to obtain a uniform solution of a pale pink color. Although the insulating medium itself had a melting point of 36° C., the resulting consolute composition with a dropped solidification point had a melting point below the room temperature.

The total amount of the consolute system was put in a beaker, and a couple of electrodes similar to those in Experimental Example 4 were inserted thereinto, applying direct current of 10 V for 1 second while maintaining the temperature at 50° C. As a result, the surface of the ITO transparent electrode was colored in reddish black.

Then, the consolute mixture was quickly cooled to 0° C. while maintaining the above-mentioned voltage. As long as the temperature was maintained at 0° C., namely, as long as the consolute mixture was in solid state, the colored condition was retained. For example, the colored condition was retained even after a storage of 2 months in a refrigerator.

No change in color occurred when direct current of 100 V was applied to the consolute mixture which was maintained at 0° C.

Experimental Example 6

This Experimental Example was also directed to the preservability of the colored and decolored conditions.

Firstly, a composition consisting of the under-mentioned components was stirred for 1 hour at 100° C. to obtain a consolute composition dissolving the respective components.

| Composition (part by weight) | |
|---|---|
| p-dodecyloxychanobiphenyl (solid-liquid transformable insulating medium) | 50 parts |
| dioctadecyldimethylammonium chloride (support electrolyte) | 50 parts |
| 2-(2'-chlorophenylamino)-6-di-n-butylamino-fluoran (a leuco dye "TH107" a product of Hodogaya Chemicals Co.) | 15 parts |

Nextly, the consolute composition was sandwiched in a thickness of 40 μm between glass electrodes of a glass cell consisting of a glass electrode having an ITO transparent electrode deposited therein in a pattern of a picture image and a glass electrode having an ITO transparent electrode deposited on the entire surface thereof.

Then, while maintaining the whole glass cell at 60° C., direct current of 6 V was applied across the glass electrodes, whereupon the ITO transparent electrode pattern was colored in dark green with a response speed of about 50 msec. (At this time, the background remained uncolored and transparent.)

As the glass cell was returned to the room temperature (with continued voltage application), the background turned into a white color of scattering nature in good contrast to the colored pattern portion of the ITO electrode, producing a picture image of excellent resolution.

This picture image retained almost the same colored condition even after a storage of 6 months at room temperature.

Experimental Example 7

In contrast to Experimental Example 6 in which a picture image is formed by way of an electrode pattern, this Experimental Example contemplated to form a picture image by controlling the solid-liquid transformation by means of laser light.

In a case where a semiconductor laser with an output of about 10 mW were used for effecting the solid-liquid transformation, there would arises a problem of low photothermic conversion efficiency since the leuco dye does not have absorption in a desired wavelength range (i.e., the wavelength range of the semiconductor laser), making it difficult to obtain a practical write-in speed. In this Experimental Example, this problem was overcome by adding a sensitized dye which has strong absorption in the wavelength range of the semiconductor laser.

Firstly, a composition consisting of the following components was stirred for 1 hour at 100° C. to obtain a consolute composition dissolving the respective components.

| Composition (part by weight) | |
|---|---|
| p-dodecyloxycyanobiphenyl (solid-liquid transformable insulating medium) | 50 parts |
| dioctadecyldimethylammonium chloride (support electrolyte) | 30 parts |
| crystal violet lactone (leuco dye) | 20 parts |
| squalium-base dye (sensitized dye) | 0.2 parts |

The used squalium-base dye had a structure as expressed by the following formula (II).

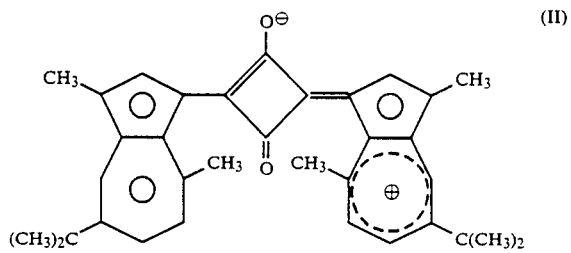

The resulting consolute composition exhibited a pale yellow-green color when no voltage was applied.

Figure 9:
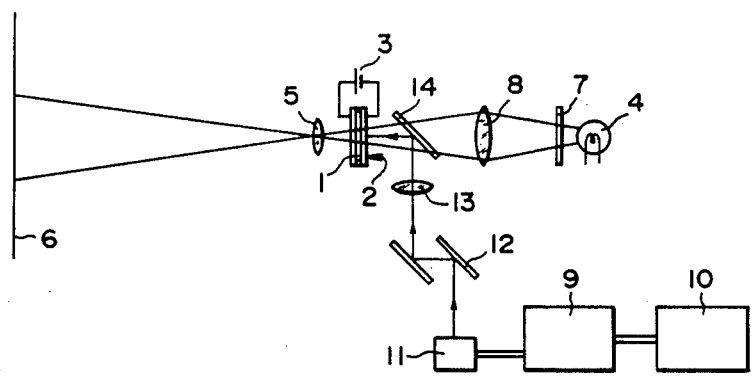
FIG. 9 is a diagrammatic illustration of a display apparatus which is arranged to display picture images by photothermal converting action of a semiconductor laser.
Figure 10:
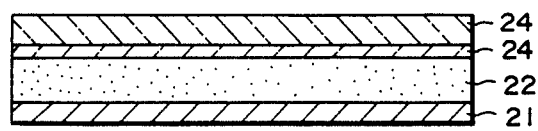
FIG. 10 is a diagrammatic fragmentary sectional view of the thermosensitive recording paper incorporating the display material according to the invention.

Then, as shown in FIG. 9, the consolute composition 1 was filled in a glass cell 2 consisting of a pair of glass electrodes each having an ITO transparent electrode coated on the entire surface thereof. This glass cell 2 was maintained at a temperature below the melting point of the filled consolute composition 1, namely, at a temperature of about 40° C., and a power source 3 is connected between the two glass electrodes, applying thereto 4 V direct current (which not yet caused coloration in any degree).

The glass cell 2 was positioned such that a picture image formed on the consolute composition 1 by using a tungsten lamp 4 as a light source would be formed on a screen 6 through a projection lens 5. Light from the tungsten lamp 4 was passed through an infrared cut-off filter to remove the infrared component, and irradiated on the glass cell 2 through a conversion lens 8.

In the next place, the laser light from a laser diode 11 (with an output of about 10 mW and a wavelength of 780 nm), connected to a power supply unit 9 and a pattern generator 10, was irradiated on the consolute composition 1 in the glass cell 2 through a galvanoscanner mirror 12, conversion lens 13 and half mirror 14. The illuminating laser light spot diameter was about 10 μm, and the illuminating pulse width was 100 μsec.

As a result, the portion of the consolute composition which was illuminated by the laser light was fused and colored. The colored condition was fixed upon cooling after stopping the irradiation. A picture image was projected on the screen 6 according to the colored condition.

Thereafter, the whole glass cell 2 was heated to 60° C., and a voltage (0.5 V) of the polarity opposite to the polarity in the image forming stage was applied, whereupon the consolute composition 1 turned into a colorless state. After cooling off, the colorless state was fixed.

Although the above-described method was arranged to color those portions of the consolute composition 1 which were irradiated with the laser light, it is also possible to precolor (e.g., in blue) the whole consolute composition 1 within the glass cell 2 thermoelectrically, and, after cooling to a temperature below the melting point, to irradiate the composition with laser light while applying a voltage of the opposite polarity thereby to decolor the irradiated portions. In this case, the picture image which is formed by the decoloration can be fixed by cooling.

Having described the display material of the invention by way of Experimental Examples, more particular examples of its application to thermosensitive recording paper are given in the following Application Examples.

Application Example 1

Employing as a support 21 a whitening film such as a polyethylene terephthalate film having a colorless or white conductive substance (e.g., TiO$_2$ particles coated with ITO film) mixed and kneaded thereinto, a consolute mixture of the following composition was wet-coated on the support body 21 and dried to form a solidified coating film 22. Thereafter, a heat resistant polyethylene terephthalate film 23 having a vacuum evaporated ITO film 24 on the entire surface on one side thereof was pressed fast to the solidified coating film 22 with heating at a temperature above the melting point of the solidified coating film 22 to obtain a heat sensitive recording film.

| Composition (part by weight) | |
|---|---|
| polystearylacrylate (melting point: 48° C.) | 200 parts |
| 2-(2'-chlorophenylamino)-6-di-n-butylamino-fluoran ("TH107" a product of Hodogaya Chemicals Co.) | 2 parts |
| dioctadecyldimethylammonium chloride | 50 parts |
| tetrahydrofuran | 500 parts |

Polystearylacrylate which was used in this Example is excellent in film-forming property and flexibility, has a specific inductive capacity suitable for forming a consolute mixture with the leuco dye and support electrolyte, along with thermally fusible or phase transition property.

A voltage (a voltage higher than about 1 V and set at 10 V in this particular Example) necessary for oxidation of the leuco dye was applied between the support body 21 and the ITO vapor deposition film 24 while printing characters (or drawing a picture) on the heat resistant polyethylene terephthalate film by a thermal head.

As a result, coloration occurred to those portions of the solid coating film 22 which reached a temperature above its melting point, and the printed character (or image) was fixed by cooling to room temperature (or leaving to cool off).

When the voltage application was suspended, heating did not cause coloration of non-printed portions (with no printed character or image). Since a color developer was absent, no coloration was observed during storage.

Then, the printed character and image were erased by heating the entire surfaces of thermosensitive recording film to a temperature above the melting point of the solid coating film 22 while applying thereto a weak voltage of the opposite polarity which would not amount to coloration. By cooling (or leaving) to solidify, the solid coating film restored the virgin state.

It is not necessarily required to apply a voltage of the opposite polarity for the above-described erasing operation, since the erasure can be effected simply by application of heat. However, in this particular example, a voltage of the opposite polarity was applied in consideration of the practical speed of the erasure.

Application Example 2

This Example was directed to the production of color image forming thermosensitive recording paper.

Figure 11:
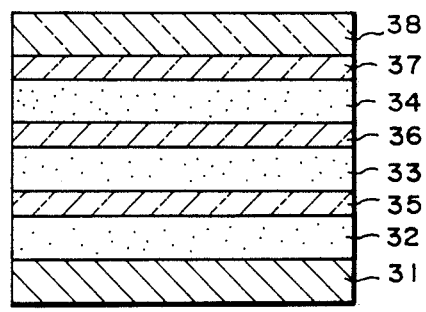
FIG. 11 is a view similar to FIG. 10 but showing a modified construction of the thermosensitive recording paper.

Similarly to the foregoing Application Example 1, a whitening film was used as a support body 31, and a heat resistant polyethylene terephthalate film, having laminated thereon a yellow electro/thermosensitive layer 32, a magenta electro/thermosensitive layer 33 and a cyan electro/thermosensitive layer 34 through ITO transparent electrode layers 35 and 36 as shown in FIG. 11, was pressed fast to the support body 31 with heating at a temperature higher than the melting point of the respective electro/thermosensitive layers 32 to 34 to obtain a thermosensitive recording film.

For the electro/thermosensitive layers 32 to 34, there were employed consolute mixtures of the same composition as in Application Example 1 except that leuco dyes of different colors were selected according to the colors to be developed by the respective layers, wet-coating and drying the compositions in the same manner to form solid coating films. The used leuco dyes were same as in Experimental Example 2, employing for the cyan color electro/thermosensitive layer 34 the leuco dye A [a phthalide compound which develops a cyan color by introducing a substituent group into the phthalide skeleton ("HC-1" a product of Hodogaya Chemicals Co.)], employing for the magenta color electro/thermosensitive layer 33 the leuco dye B [a fluoran compound which develops a magenta color by changing a substituent group of the fluoran skeleton ("HM-1" a product of Hodogaya Chemicals Co.)], and employing for the yellow color electro/thermosensitive layer 32 the leuco dye C [a fluoran compound which develops a yellow color by changing a substituent group of the fluoran skeleton ("HY-1" a product of Hodogaya Chemicals Co.)].

On the thermosensitive recording paper with the three different kinds of electro/thermosensitive layers laminated alternately with transparent electrodes for coloration in yellow, magenta and cyan colors as mentioned hereinbefore, an image was formed by the following method.

Firstly, a necessary voltage was applied to the yellow electro/thermosensitive layer 32 alone (or only between the support body 31 and the transparent electrode 35) while imparting a thermal latent image by a thermal head, cooling (or leaving to cool off) after color development. As a result, only the yellow electro/thermosensitive layer 32 was colored according to the imparted thermal latent image, and the colored condition was fixed.

Nextly, a necessary voltage was applied to the magenta color electro/thermosensitive layer 33 alone (or only between the transparent electrodes 35 and 36) while imparting a thermal latent image thereto by the thermal head in the same manner as in the case of the yellow electro/thermosensitive layer 32, cooling (or leaving to cool off) after color development. As a result, only the magenta electro/thermosensitive layer 33 was colored according to the imparted thermal latent image, and the colored condition was fixed.

Then, a necessary voltage was applied to the cyan electro/thermosensitive layer 34 alone (or only between the transparent electrode 36 and the ITO vapor deposition film 37), coloring and fixing the colored condition of the cyan electro/thermosensitive layer 34 in the same manner.

Consequently, a full-color picture image was formed on the recording paper.

In a case where the picture image formed by the yellow, magenta and cyan colors lacks black density, a black electro/thermosensitive layer may be additionally laminated for coloration in black.

In this Application Example employing a triple-layer construction for full-color display, the solid-liquid transformable insulating medium to be used for the respective electro/thermosensitive layers 32 to 34 is preferred to be optically transparent. Of course, even if there is a slight degree of light scattering in the electro/thermosensitive layers 32 to 34, its influence can be suppressed to a practical level by controlling the thickness of these layers. For example, excellent transparency can be obtained by the use of a stearylacrylate-stearylmethacrylate copolymer or the like.

As clear from the foregoing description, the display material of the invention is provided with a material layer which contains a dye capable of changing its coloring condition by oxidation-reduction reaction and a support electrolyte and which is solid-liquid transformable by heating and cooling, so that the coloring condition of the dye can be controlled thermally and electrically by utilization of the solid-liquid transformation of the material layer and oxidation-reduction reaction by current application, permitting to effect the coloration, decoloration or discoloration at a practical speed, and to fix or reproduce the colored, decolored or discolored condition if necessary.

Further, the display material of the invention can be handled in solidified state before use (or during storage), and less susceptible to variations in concentration due to volatilization of the solvent, in addition to the advantages such as easy colored display and vivid coloration.

Thus, the display material of the invention has an extremely great value of use and can find applications in various fields including electrochromic display elements, thermosensitive recording paper and the like.

I claim:

1. A display material comprising a material layer formed on a conducting substrate containing a leuco dye and an electrolyte, said material layer being capable of solid-liquid transformation upon heating and cooling of said layer, and said layer being capable of effecting coloration or discoloration by oxidation and reduction of said dye by applying current to said material layer through said conducting substrate when said material layer is in liquid state.

2. A display material according to claim 1, said dye is a leuco dye having a lactone ring in the molecule of said leuco dye.

3. A display material according to claim 1, said material layer further containing a polymer binder.

4. A display material according to claim 1, wherein said conducting substrate comprises a pair of transparent electrodes.

5. A display material according to claim 1, said coloration and discoloration are effected by selective heating of said material layer under the application of the current to the whole surface of said material layer.

6. A display material according to claim 1, said coloration and discoloration are effected by selective application of the current to said material layer under the condition that the whole area of said material layer is in a liquid state.

7. A display material comprising a material layer formed on a conducting substrate containing a leuco dye and an electrolyte, said material layer being capable of solid-liquid transformation upon heating and cooling of said layer, and said layer being capable of effecting coloration or discoloration by oxidation and reduction of said dye by applying current to said material layer through said conducting substrate when said material layer is in liquid state, and said material layer is formed on a conductive substrate.

8. A display material comprising, a first transparent conductive substrate, a first material layer which has a first dye for a first color formed on said first conductive substrate, a second transparent conductive substrate, a second material layer which contains a second dye which has a second color formed on said second transparent conductive layer; said first and second dyes comprising leuco dyes and electrolytes, said first and second material layers being capable of solid-liquid transformation upon heating and cooling of said first and second material layers, and said first and second material layers being capable of effecting coloration or discoloration by oxidation and reduction of said first and second dyes by applying current to said first and second material layers through said first and second conducting substrates when said first and second material layers are in liquid state.

* * * * *